United States Patent [19]

Kagohata

[11] 4,320,797
[45] Mar. 23, 1982

[54] CONTROL APPARATUS FOR AIR CONDITIONER OF AUTOMOBILE

[75] Inventor: Tsuneo Kagohata, Katsuta, Japan
[73] Assignee: Hitachi, Ltd., Tokyo, Japan
[21] Appl. No.: 145,149
[22] Filed: Apr. 30, 1980

Related U.S. Application Data

[63] Continuation-in-part of Ser. No. 106,084, Dec. 21, 1979, abandoned, which is a continuation of Ser. No. 913,686, Jun. 8, 1978, abandoned.

[30] Foreign Application Priority Data

Jun. 10, 1977 [JP] Japan .................................. 52/67943

[51] Int. Cl.³ .............................................. F28F 27/00
[52] U.S. Cl. ........................................ 165/12; 165/28; 165/43; 165/30; 237/12.3 B; 340/147 R
[58] Field of Search ....................... 165/12, 26, 27, 42, 165/43, 28, 30; 237/12.3 B; 340/52 F, 147 R; 137/DIG. 2, 627, 883

[56] References Cited

U.S. PATENT DOCUMENTS 3,983,930 10/1976 Franz .................................. 165/42 X
4,206,612 6/1980 Gardner ............................. 165/12 X Primary Examiner—Albert W. Davis
Assistant Examiner—Margaret A. Focarino
Attorney, Agent, or Firm—Craig and Antonelli

[57] ABSTRACT

A control apparatus for an air conditioner of an automobile transmits an air conditioning signal from a control panel of the automobile to a control circuit of the air conditioner through a power supply in order to control the air conditioner. The control panel includes an encoder for binary-encoding the air conditioning signal so that the binary coded signal is transmitted to the control circuit through the power supply, and a decoder for decoding the binary coded signal.

13 Claims, 8 Drawing Figures

CONTROL APPARATUS FOR AIR CONDITIONER OF AUTOMOBILE

CROSS-REFERENCES TO RELATED APPLICATIONS

This application is a continuation-in-part of application Ser. No. 106,084, now abandoned, filed Dec. 21, 1979, which is a continuation of application Ser. No. 913,686 filed June 8, 1978, now abandoned.

BACKGROUND OF THE INVENTION

The present invention relates to a control apparatus for an air conditioner of an automobile (hereinafter referred to as an air conditioner), and more particularly to an improvement of such a control apparatus in which means for selecting an operation mode of the air conditioner includes means for electrically processing signals.

The air conditioner is used under any weather conditions and hence it has a mode of cooling/warming selection as well as other operation modes such as ventilation, dehydration, defrosting of the windshield, selection of an exit of cool or warm air, and selection of fresh and recirculation air.

The mode selection in such an apparatus is carried out by manipulating levers and/or dials of a dash control box mounted in a dash board. When a lever is moved to a position where a desired mode is indicated, a movable contact interlocked with the lever contacts with a stationary contact to complete an electric circuit so that one or more control elements in the air conditioner are actuated by drive means energized by the electric circuit in order to select the desired mode.

In the prior art mode selection device, the electric closed circuits which are equal in number to the number of modes are required. Consequently, electric wires which are equal in number to the number of modes must be distributed over a long distance from the dash control box to the drive means. Therefore, when the number of modes is to be increased, the number of electric wires increases and the volume of the electric wires causes the volume of the control box to increase and the workability in the mounting operation of the control box is deteriorated.

SUMMARY OF THE INVENTION

It is an object of the present invention to provide a mode selection device which can select many modes yet requires less number of electric wires and provides simple construction of the dash control box.

It is another object of the present invention to reduce the number of electric wires required for simplifying the wiring operation.

A feature of the present invention resides in means for producing a binary coded signal for each mode by the use of movable contacts which are in interlocking movement with the mode selection lever and by the use of a circuit board mounted in the control box and means for decoding the binary coded signal arranged together with an electric circuit of drive means, the circuit board and the decode means being interconnected by electric wires or conductors through which the binary coded signal is transmitted.

DESCRIPTION OF THE PREFERRED EMBODIMENTS

Referring to the accompanying drawings, the preferred embodiments of the control apparatus for the air conditioner in accordance with the present invention will be explained in detail.

Figure 1:
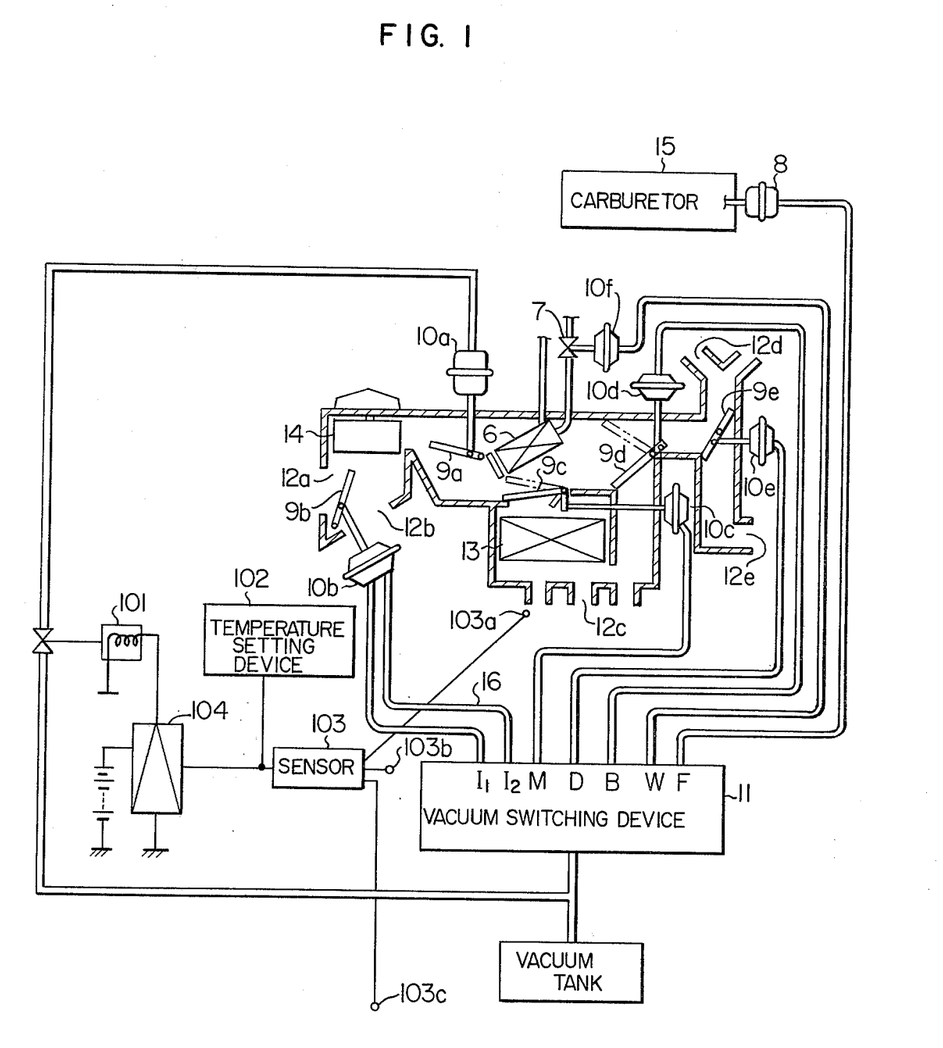
FIG. 1 is a schematic sectional view illustrating a construction of an automobile air conditioner.

FIG. 1 shows a schematic diagram for illustrating the principle of operation of an automobile air conditioner to which the present invention is applied. In FIG. 1, numeral 6 denotes a heater core, 7 denotes a water cock for passing or blocking hot water flowing into the heater core 6, numeral 8 denotes a high speed idling control device which automatically raises the idling r.p.m. of an engine to supplement a shortness of the power of the engine which may be caused due to a compressor of a cooler being operated even during parking of the automobile, numerals 9a to 9e denote doors for selectively opening or closing air paths to select exits of air or air paths, numerals 10a to 10e denote actuators provided one for each of the doors 9a to 9e for opening or closing the doors, numeral 10f denotes an actuator for opening or closing the water cock 7, numeral 11 denotes a vacuum switching device for selectively supplying vacuum to the actuators 10b to 10f to actuate these actuators by vacuum, numerals 12a and 12b denote air suction ports, numerals 12c to 12e denote air exit ports, numeral 13 denotes an evaporator core, 14 denotes a fan, 15 denotes an engine carburetor which is controlled by the high speed idling control device 8, numeral 16 denotes vacuum hoses which connect the vacuum switching device 11 with the actuators 10b to 10f. The vacuum switching device 11 functions to apply vacuum to the actuators 10b to 10f or open them to atmosphere, as required, and it comprises solenoid-operated electric vacuum switching valves. The mode selection is carried out by controlling the application of vacuum to the actuators 10b to 10f through the vacuum switching device 11. Numeral 12a denotes an air inlet port through which fresh air is taken in, numeral 12b denotes an air inlet port through which internal (recirculation) air is taken in, numeral 12c denotes the air exit for a ventilator, numeral 12d denotes an air exit for a defroster, and numeral 12e denotes an air exit for cool/warm air.

The door 9a is a so-called air-mix door which changes proportion of the amount of air which flows from the inlet ports 12a and 12b into the heater core 6 and the amount of air which bypasses the heater core 6, numeral 9b denotes a door which selects fresh or recirculation air to be sucked, numeral 9c denotes a door which determines whether the air taken in is to be introduced to the air exit 12c through the evaporator 13 or not, numeral 9d denotes a door which selects port 12c or ports 12d and 12e as the air exit, and numeral 9e denotes a door which selects 12d or 12e as the air exit.

Each of the modes for air conditioning shown in Table 1 is determined by proper selection of the doors 9a to 9e and the states of the water cock 7 and the high speed idling control device 8.

The air conditioning modes include a high cooling mode (MAX COOL) in which the cabin is air-conditioned by a cooler only, a moderate mode (AIR CON) in which the cabin temperature is properly adjusted, a ventilation mode (VENT) in which fresh air is introduced, cool-at-head and warm-at-feet mode (BI-LEVEL) in which warm air is jetted from the bottom and cool air is jetted from the top, a ventilation warming mode (FRE. HEATER) in which fresh air is introduced and heated for warming, recirculation air warming mode (REC. HEATER) in which recirculation air is heated and recirculated, and a defrost mode (DEF) in which a windshield is defrosted.

TABLE 1

| MODE | F | $I_2$ | $I_1$ | M | B | D | W |
|---|---|---|---|---|---|---|---|
| MAX COOL | o | x | x | x | x | x | x |
| AIR CON | o | x | o | x | x | x | o |
| VENT | x | o | o | x | x | x | x |
| Bi-LEVEL | x | o | o | x | o | o | o |
| FRE. HEATER | x | o | o | o | o | o | o |
| REC. HEATER | x | x | x | o | o | o | o |
| DEF | x | o | o | o | o | x | o | o : supplied with vacuum
x : opened to atmosphere
W : water cock vacuum output nipple
D : defrost-recirculation selection door vaccum output nipple
B : bypass door vacuum output nipple
M : mode door vacuum output nipple
$I_1$ : intake door 1 vacuum output nipple
$I_2$ : intake door 2 vacuum output nipple
F : high speed idling control device actuator vacuum output nipple By way of example, the operation of the air conditioner shown in FIG. 1 is explained for the "AIR CON" mode. As seen from Table 1, the vacuum output nipples W, $I_1$ and F of the vacuum switching device 11 are supplied with vacuum while other nipples are opened to atmosphere. Accordingly, the door 9b is pulled to a mid-position by the actuator 10b while other doors 9c, 9d and 9e are positioned at pushed-back positions by springs (not shown) disposed in the actuators. (9c and 9d are at broken line positions in FIG. 1 and 9e is at solid line position in FIG. 1.) The water cock 7 is opened by the actuator 10f so that hot water from the engine of the automobile flows into the heater core 6. At the same time, the high speed idling control device 8 operates to keep the idling r.p.m. of the engine at a higher r.p.m. Air is taken from the fresh and recirculation air inlets 12a and 12b at a proportion of 80% recirculation air and 20% fresh air, which is determined by the door 9b, and this air is divided into two parts by the door 9a, one part being heated by the heater core 6 and the other part being cooled by the evaporator 13. The warm air and the cool air are mixed and jetted from the air exit 12c into the room. The temperature of the air jetted, the temperature of the room and the temperature of fresh air are sensed by sensors 103a, 103b and 103c, respectively, and an output signal of a comparing amplifier 104 is controlled so that it is in a predetermined relationship with a signal from a temperature setting device 102. The output signal of the comparing amplifier 104 controls a transducer 101 which controls the vacuum applied from the vacuum tank to the actuator 10a which actuates the door 9a. As a result, the door 9a is moved to a position at which the proportion of air is such that the temperature in the room becomes equal to the preset temperature.

Figure 2:
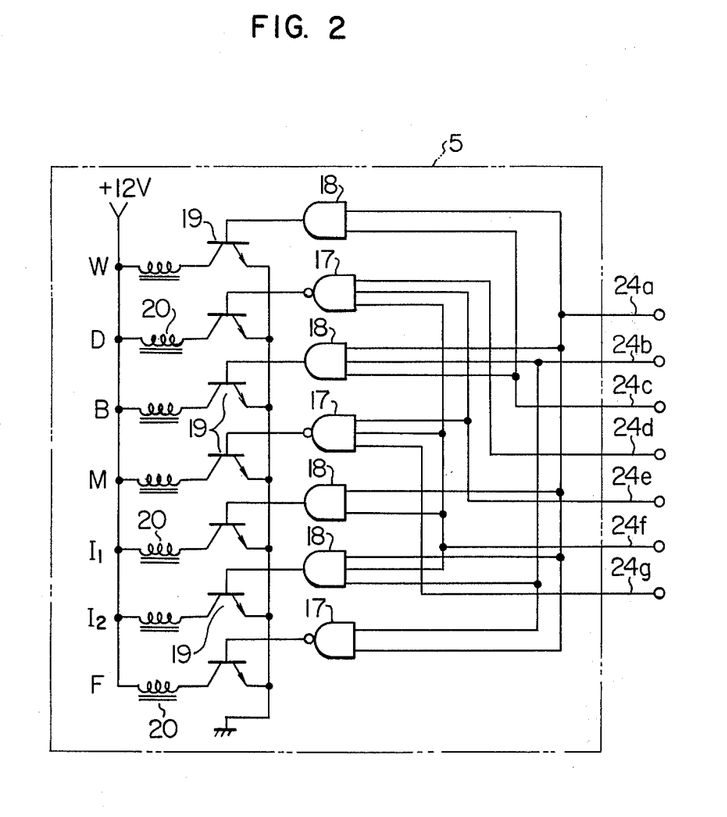
FIG. 2 is a wiring diagram showing electrical connection in a control apparatus.

FIG. 2 shows a circuit configuration of the control circuit 5 which uses logical gates to attain the air conditioning modes shown in Table 1. The control circuit receives air conditioning mode signals from the control panel and logically processes the signals by the logical gates comprising NAND gates 17 and AND gates 18 in order to produce the signal outputs shown in Table 1 for the respective air conditioning mode signals. When transistors 19 for driving the electric vacuum switching valves receive "1" signals as represented by a predetermined positive voltage from the NAND gates 17 and the AND gates 18, they are turned on to energize the coils 20 of the electrical vacuum switching valves disposed in the vacuum switching device 11 in FIG. 1. As a result, the electrical vacuum switching valves apply the vacuum to the corresponding actuators.

While the vacuum switching valves are driven by the transistors in the illustrated embodiment, electrically driven rotary vacuum switching valves each of which comprises a well-known rotary solenoid, a stepping mechanism, a rotary switch and a rotary vacuum switching valve may be used. Further, the vacuum actuators (e.g., 10a to 10f) and the vacuum switching valves (e.g. valves in 11), constituting an operating means, may be replaced by an electromagnetic actuator which includes electromagnetic coils and rods connected with the doors and the water cock and directly driven by electromagnetic force produced by the electromagnetic coils so that the positions of the doors and the water cocks are switched.

Figure 3:
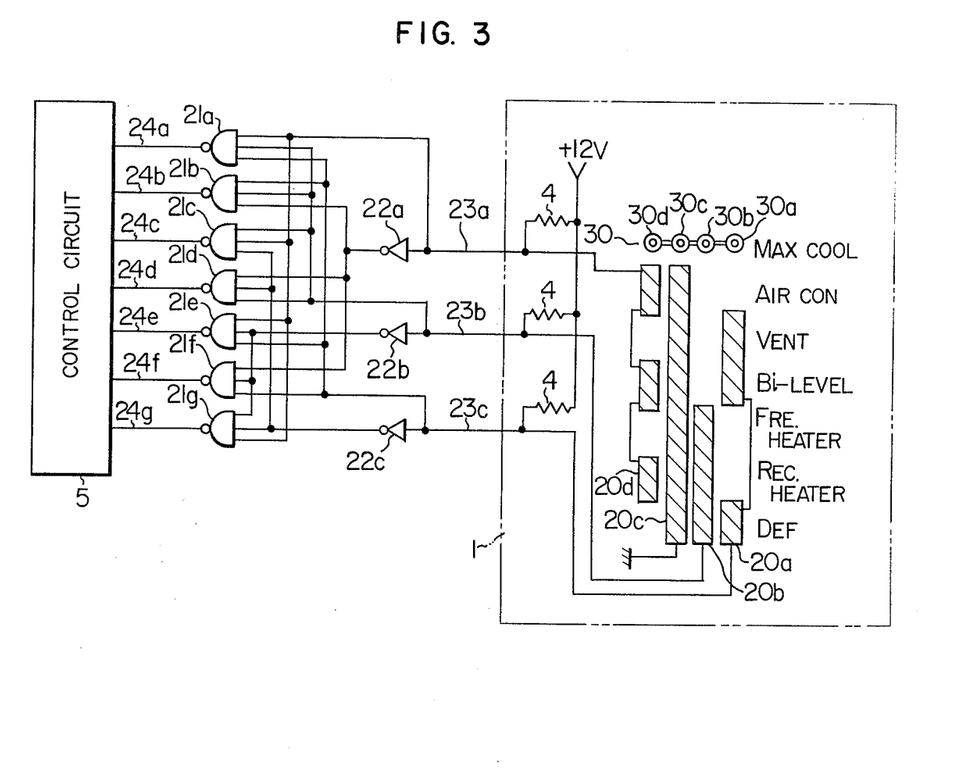
FIG. 3 is a wiring diagram illustrating signal transmission in accordance with one embodiment of the present invention.

FIG. 3 shows one embodiment of the present invention which attains the air conditioning modes shown above, In response to a selected mode, a movable contact unit 30 which is moved with a lever disposed in a control box, e.g., in the dash control box 1 slides on stationary contacts 20a to 20d to selectively connect four rows of stationary contacts. The control box in which the lever 30 is disposed may be alternatively a control box mounted on the panel of an air conditioner unit or on a door of an automobile. The stationary contacts 20a to 20d and the movable contact unit 30 constitute a 3-bit binary signal converter. In the illustrated embodiment, the number of modes to be set is 7, and according to binary notation, three identification signals provide discrimination of $2^3 = 8$ states. Consequently, three signal transmission wires 23a to 23c are connected to the stationary contacts 20a to 20d, and the 3-bit binary signals as shown in Table 2 are transmitted through the signal transmission wires 23a to 23c by the connection with resistors 4.

TABLE 2

| | MODE | | | | | | |
|---|---|---|---|---|---|---|---|
| | | | SIGNAL | | | | |
| TRANSMIS-SION WIRE | MAX COOL | AIR CON | VENT | Bi-LEVEL | FRE. HEATER | REC. HEATER | DEF |
| 23a | 1 | 0 | 1 | 0 | 1 | 0 | 1 |
| 23b | 1 | 1 | 1 | 1 | 0 | 0 | 0 |

TABLE 2-continued

| TRANSMISSION WIRE | MODE | | | | | | |
|---|---|---|---|---|---|---|---|
| | SIGNAL | | | | | | |
| | MAX COOL | AIR CON | VENT | Bi-LEVEL | FRE. HEATER | REC. HEATER | DEF |
| 23c | 1 | 1 | 0 | 0 | 1 | 1 | 0 |

The movable contact unit 30 has four sliders 30a to 30d which are connected together by conductors.

Four rows of stationary contacts 20a to 20d are arranged along a moving path of the sliders.

Seven modes are indicated on the surface of the dash control box. When the movable contact 30 is moved to a particular mode position, one of the stationary contacts 20a, 20b and 20d is connected to the ground contact 20c by the movable contact unit 30. As a result, the binary coded signals which are unique to the respective modes and which comprise the combinations of ground potential and positive potential as shown in Table 2 are produced on the signal wires 23a to 23c.

These signals are logically processed by the logical gates comprising the NOT gates 22a to 22c and the NAND gates 21a to 21g arranged adjacent to the control device 5, and converted to the signals shown in Table 3 and applied to the control device 5 to attain the air conditioning modes described above.

TABLE 3

| SIGNAL CIRCUIT | MODE | | | | | | |
|---|---|---|---|---|---|---|---|
| | MAX COOL | AIR CON | VENT | Bi-LEVEL | FRE. HEATER | REC. HEATER | DEF |
| 24a | 0 | 1 | 1 | 1 | 1 | 1 | 1 |
| 24b | 1 | 0 | 1 | 1 | 1 | 1 | 1 |
| 24c | 1 | 1 | 0 | 1 | 1 | 1 | 1 |
| 24d | 1 | 1 | 1 | 0 | 1 | 1 | 1 |
| 24e | 1 | 1 | 1 | 1 | 0 | 1 | 1 |
| 24f | 1 | 1 | 1 | 1 | 1 | 0 | 1 |
| 24g | 1 | 1 | 1 | 1 | 1 | 1 | 0 |

When the mode AIR CON, for example, is selected, three-bit binary code "0, 1, 1" appears on the signal transmission wires 23a to 23c in accordance with the Table 2, and the NOT circuits 22a to 22c produce "1, 0, 0". Accordingly, only the NAND gate 21b receives "1"'s at all of its input terminals and "0" output signal appears only on the signal circuit 24b. When other modes are selected, the signals as shown in Table 3 appear at the signal circuit 24 in the similar manner.

With the arrangement described above, the number of signal transmission wires 23 required for a given number of modes can be considerably reduced.

Figure 4:
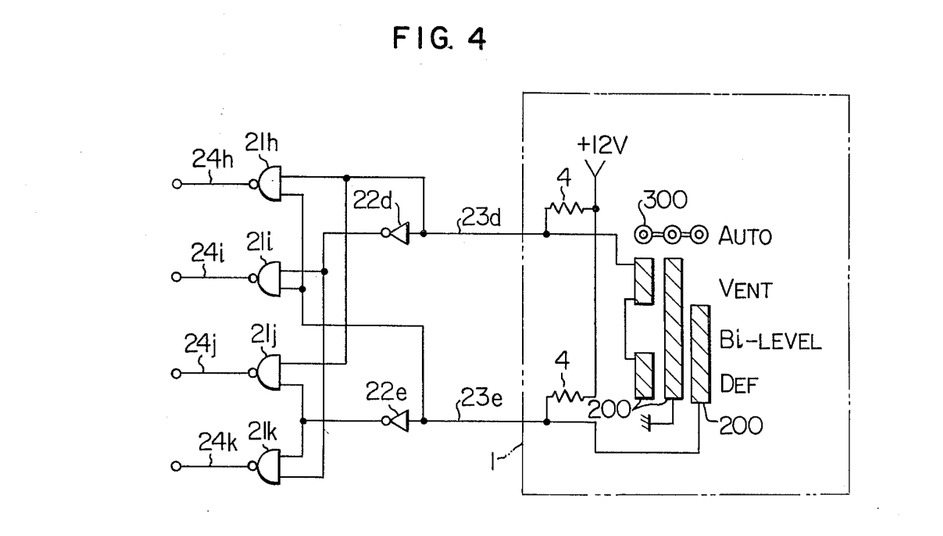
FIG. 4 is a wiring diagram showing another embodiment of the present invention.

FIG. 4 shows another embodiment of the present invention, which differs from the embodiment of FIG. 3 in that stationary contact unit 200 and a movable contact unit 300 constitute a two-bit binary converter and the number of air conditioning modes selectable is reduced to four. As is apparent from the principle of binary notation, in the present embodiment, all of the air conditioning modes can be selected by two signal transmission wires, and the signals on the signal transmission wires 23d and 23e in the respective modes of the embodiment are shown in Table 4 and the signals in the signal circuits 24h to 24k are shown in Table 5. Comparing the present embodiment with the embodiment of FIG. 3, the same function as that in the embodiment of FIG. 3 is attainable by replacing the modes MAX COOL, AIR CON, FRE HEATER and REC HEATER with AUTO, VENT, Bi-LEVEL and DEF, respectively, and using the signals of the signal circuits 24a, 24b, 24e and 24f.

TABLE 4

| TRANSMISSION WIRE | MODE | | | |
|---|---|---|---|---|
| | SIGNAL | | | |
| | AUTO | VENT | Bi-LEVEL | DEF |
| 23d | 1 | 0 | 1 | 0 |
| 23e | 1 | 1 | 0 | 0 |

TABLE 5

| SIGNAL CIRCUIT | MODE | | | |
|---|---|---|---|---|
| | AUTO | VENT | Bi-LEVEL | DEF |
| 24h | 0 | 1 | 1 | 1 |
| 24i | 1 | 0 | 1 | 1 |
| 24j | 1 | 1 | 0 | 1 |
| 24k | 1 | 1 | 1 | 0 |

In FIGS. 3 and 4, the movable contacts are mounted on a lever while the stationary contacts are in the form of linear parallel rows each consisting of one or more contact pieces. However, the stationary contacts may be in the form of concentric circular conduction paths each consisting of one or more contact pieces while one or more movable contacts are mounted for selective engagement with the stationary contacts due to interlocking movement with a rotary shaft of a knob.

As described hereinabove, according to the present invention, by providing logical gates which correspond in number to the maximum number of air conditioning modes, they can be used for general purpose. Accordingly, when the circuit is integrated in one chip IC, the logical gates can be provided at very low cost.

Figures 5, 6, 7, 8:
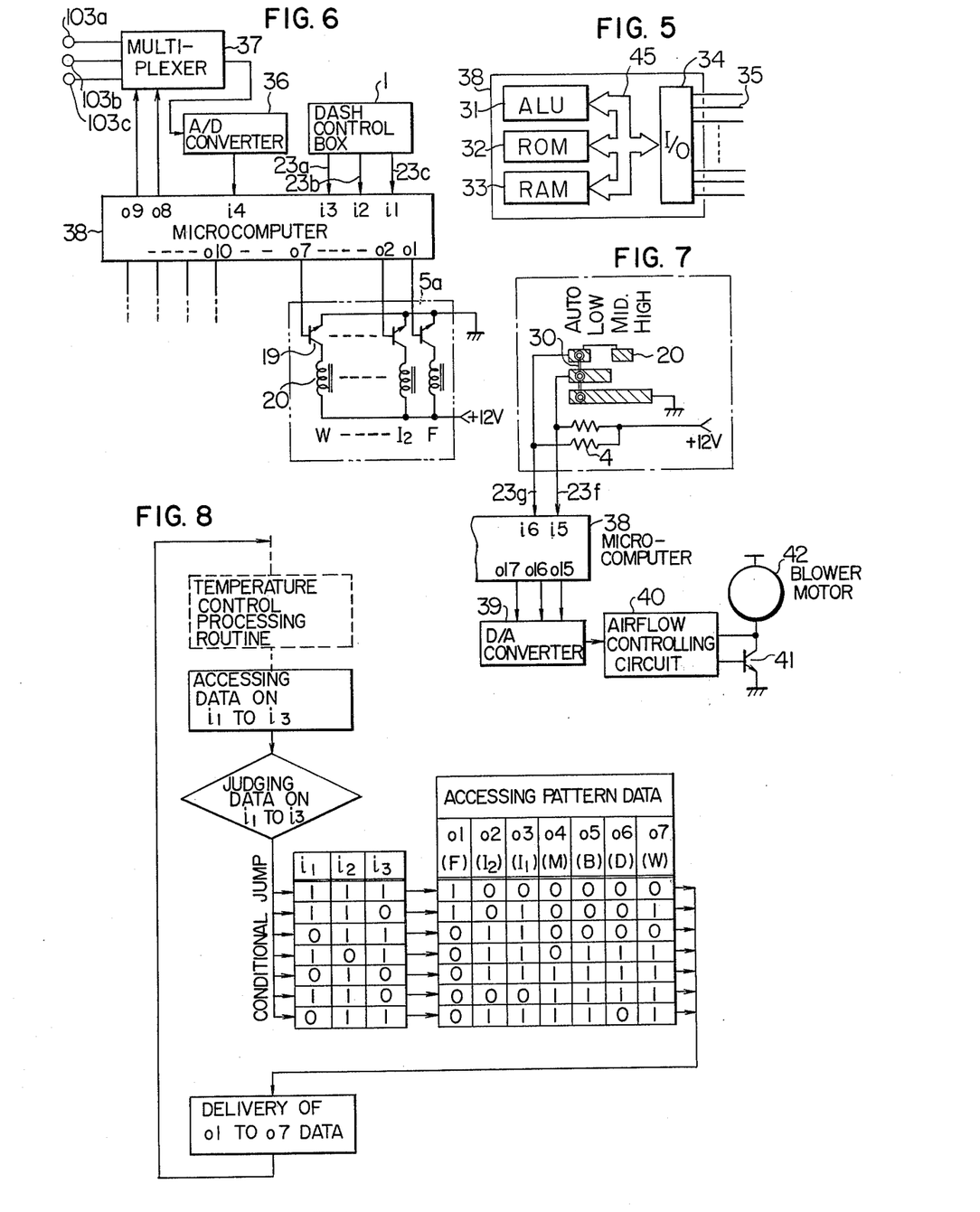
FIG. 5 is a diagram showing a basic structure of microcomputer.
FIGS. 6 and 7 are diagrams of other embodiments of the present invention.
FIG. 8 is a flow chart illustrating steps for decoding operation of the microcomputer concerning FIG. 6 embodiment.

Turning now to FIGS. 5 and 6, a further embodiment of the present invention will be described. Since the function of a mirocomputer is applied for decoding the binary signal in this embodiment, an exemplary construction of a microcomputer will first be described with reference to FIG. 5. A microcomputer 38 generally comprises, as shown in FIG. 5, an arithmetic and logic unit (ALU) 31, a read only memory (ROM) 32, a random access memory (RAM) 33, and an input/output unit (I/O) 34 which are interconnected by a bus bar 45 for inter-transmission and reception of signals. A program for performing the controlling function is stored in the ROM and in accordance with the stored program, the input signal and data of the RAM are operated in the ALU so that the output signal in accordance with the result of operation is delivered out. FIG. 6 shows a connection for carrying out the controlling as explained with reference to FIGS. 1, 2 and 3. As shown, there is provided a dash control box 1 as shown in FIG. 3 and the binary coded signal in accordance with the selective mode as listed in Table 2 is transmitted via signal transmission wires 23a to 23c. There is also provided a driver 5a similar to that of the control circuit 5 as shown in FIG. 2, whereby coils 20 of the electrical vacuum switching valves are energized in accordance with input signals applied to the bases of transistors 19. Sensors 103a to 103c, corresponding to those of FIG. 1, are connected via a multiplexer 37 and an A/D converter 36 to the microcomputer 38, which can access temperature data on an input terminal $i_4$. Output terminals o10, o11, o12, ... are connected to the actuators for the compressors, air-mix doors and so on. In operation, when the binary coded signal so determined by manipulating the dash control box 1 as to correspond to the selected mode is applied to input terminals $i_1$ to $i_3$ of the microcomputer 38, the microcomputer 38 accesses the binary coded signal on the input terminals $i_1$ to $i_3$ under the control of the program stored in the ROM. This binary data is operated and decoded in the ALU and an address corresponding to the decoding result is searched in the ROM 32 to read out data for a control output stored at the address. The read out data for a control output is once stored in the RAM 33 and is thereafter read out therefrom at the output terminals o1 to o7. Alternately, the binary data may be decoded directly by the ROM 32 so that data for a control output corresponding to one of the binary signals listed in Table 1 is delivered directly from the ROM 32 at the output terminals o1 to o7. For decoding the binary coded signal with the ROM, a binary data corresponding to the mode and an output data corresponding thereto are stored in the ROM in advance, the binary coded signal from the dash control box is compared with the binary data stored in the ROM, and the output data corresponding to the binary data in coincidence as a result of the comparison is taken out of the output terminals.

In this manner, the controlling as described with reference to FIGS. 1, 2 and 3 can be accomplished. The microcomputer 38 in this embodiment is accessible to the sensors 103a to 103c to thereby effect simultaneously the room temperature controlling. Accordingly, when compared with the foregoing embodiments, the microcomputer 38 acts as a logic operation circuit wherein the ALU, ROM or RAM, and I/O unit operate on the time division basis to decode the binary code.

Next, an exemplary internal operation of the microcomputer as shown in FIGS. 5 and 6 will be described with reference to FIG. 8. The microcomputer operates successively in accordance with the program stored in the ROM and particularly, in this embodiment, it also carries out the temperature controlling. Therefore, the input/output processing in accordance with this embodiment is accomplished within the same program loop as for the temperature control processing program. As shown in FIG. 8, when a processing routine for the temperature control is completed, data on the input terminals $i_1$ to $i_3$ are accessed and stored in part of the RAM in accordance with the program stored in the ROM. Thereafter, the magnitude of the input data is judged at the ALU and when the input data is subject to the conditional jump, pattern data corresponding to the input data is accessed. This pattern data of a nonvolatile numerical list stored in the ROM in advance corresponds to Table 1 set forth hereinbefore. Logic "1" or "0" of a 7-bit code representative of the pattern data is once stored in the remaining part of the RAM and then sent to the corresponding output terminals o1 to o7 to be held thereat. Thereafter, the program returns to the initial block and a similar processing is repeated. The above operation specified in connection with the AIR CON mode selection will be described in more detail. When AIR CON mode is selected by manipulating the dash control box 1, a binary coded signal of "110" is sent onto the signal transmission wires 23c to 23a, as will be seen from FIG. 3 and listed in Table 2. The microcomputer then receives the "110" signal via the input terminals $i_1$ to $i_3$. This data accessed by the microcomputer is subjected to the conditional judgement at the ALU for coincidence with the value on the upper, second line in FIG. 8. Accordingly, the output data selected from the second line of the pattern data is accessed by the RAM and an output "1010001" is held on the output terminals o1 to o7. Since logic "1" is held on the output terminals o1, o3 and o7, the corresponding transistors 19 are turned on to ensure that the electrical vacuum switching valves, as represented by characters F, $I_1$ and W, which are associated with these turned-on transistors are supplied with vacuum whereas the remaining electrical vacuum switching valves, as represented by $I_2$, M, B and D, are opened to the atmosphere because of logic "0" present on the associated output terminals of the microcomputer. In this way, the controlling as shown in Table 1 can be completed.

As described above, this embodiment can eliminate the logic operation circuit in the form of a gate circuit by making use of part of the microcomputer for room temperature controlling, thereby making it possible to simplify the circuit and connection as required and at the same time to readily adapt to alteration of the controlling specifications.

It is apparent from the illustrated embodiments that the present invention is applicable to a control apparatus having any number of selectable positions. Since the effect of the present invention is larger as the number of positions increases, the present invention is applicable not only to the mode selection but also to the control of blower (as will be described later with reference to FIG. 7) and digital temperature control with temperature settings at the interval of 1° C., which temperature control has been usually carried out by analog control.

Reference is now made to FIG. 7 which illustrates a blower controlling embodying the present invention, with eliminating of the same element as those of the embodiment explained with reference to FIG. 6. As shown, a dash control box 1 adapted for the blower controlling is connected to input terminals $i_5$ and $i_6$ of a microcomputer 38 via two signal transmission wires 23f and 23g. Three-bit output terminals o15 to o17 are connected to a D/A converter 39 whose output is connected to a circuit 40 for controlling the amount of air. The airflow controlling circuit 40 has an output terminal connected to the base of a power transistor 41 connected in series with a blower motor 42 and controls the base current of the power transistor 41 in accordance with the output of the D/A converter.

To give a brief description of the function of the above component elements, the dash control box 1 for selecting the airflow has, as usual, an AUTO mode for automatically controlling the airflow, a LOW mode for fixing a low airflow, a MID mode for fixing a middle airflow, and a HIGH mode for fixing a high airflow. As soon as an airflow mode is selected by manipulating the dash control box 1, the binary coded signal is listed in the following Table 6 is delivered to the microcomputer 38 via the signal transmission wires 23f and 23g.

TABLE 6

| SIGNAL TRANSMIS-SION WIRE | MODE | | | |
|---|---|---|---|---|
| | AUTO | LOW | MID | HIGH |
| 23f | 1 | 1 | 0 | 0 |
| 23g | 1 | 0 | 1 | 0 |

The digital output signal from the output terminals o15 to o17 is converted at the D/A converter 39 into an analog signal corresponding to the output on the output terminals o15 to o17, and the airflow controlling circuit 40 and the power transistor 41 control a voltage applied to the blower motor 42 to a value corresponding to the analog signal voltage, thereby controlling the speed of revolution of the motor 42 which results in an airflow control. In this manner, the microcomputer 38 decodes, in accordance with an internal program, the binary coded signal from the signal transmission wires 23f and 23g and produces from the output terminals o15 to o17 the output corresponding to temperature sensed by sensors 103a to 103c during the AUTO mode. During the LOW, MID and HIGH modes, the microcomputer 38 produces from the output terminals o15 to o17 the outputs corresponding to the small, middle and large amounts of air, respectively. Consequently, it is possible to accomplish the blower controlling by manipulating the dash control box 1.

It may of course be possible to employ such a mommon stationary contact unit in cooperation with a movable contact unit to produce binary coded signals for allowing selection of a blower airflow control mode as one of the air conditioning modes such as the defrost mode and the bi-level mode. For example, a stationary contact unit and a movable contact unit are formed and arranged along with signal transmission wires similarly to those 20a to 20d, 30a to 30d and 23a to 23c shown in FIG. 3, thereby providing binary coded signal producing means. Here in this case, air conditioning modes are set for the binary signals appearing on the signal transmission wires as listed in the following Table 7. For convenience sake, the three signal transmission wires in this case are denoted by 23a', 23b' and 23c' since illustration of the contact units and the transmission wires are omitted.

TABLE 7

| SIGNAL TRANSMISSION WIRE | MODE | | | | | | |
|---|---|---|---|---|---|---|---|
| | OFF | AUTO | | | VENT | Bi-LEVEL | DEF |
| | | LOW | AUTO | HIGH | | | |
| 23a' | 1 | 0 | 1 | 0 | 1 | 0 | 1 |
| 23b' | 1 | 1 | 1 | 1 | 0 | 0 | 0 |
| 23c' | 1 | 1 | 0 | 0 | 1 | 1 | 0 |

When a binary signal "011" appears on the signal transmission wires 23a' to 23c', the temperature control is performed in accordance with the outputs of the sensor 103 while the airflow by the blower motor 42 is set for a low airflow (a low revolution speed) as in "LOW" mode illustrated with reference to FIG. 7. When a binary signal "110" appears on the signal transmission wires, both the temperature control and the airflow control are performed in accordance with the outputs of the sensor 103. (Namely, the airflow contol is in "AUTO" mode illustrated in FIG. 7.) When a binary signal "010" appears on the signal transmission wires, the temperature control is performed by the outputs of the sensor 103 while the airflow by the blower motor 42 is set for a high airflow (a high revolution speed) as in "HIGH" mode illustrated with reference to FIG. 7.

It should also be appreciated that when a control circuit board incorporated with the logic operation circuit or the microcomputer is disposed on the control box and a group of contacts for production of the binary coded signal is constituted by a conductor pattern formed on the control circuit board, an extremely compact control apparatus for air conditioner can be fabricated. In this case, wires for connecting the contacts to the operation circuit or the microcomputer on the board can be in the form of a conductor pattern printed on the board.

According to the present invention, since the number of signal transmission wires distributed from the dash control box can be considerably reduced, the wiring operation can be simplified and the volume occupied by the wires can be reduced so that the dash control box can be assembled in a small size and at low cost. Furthermore, since the circuit for converting the binary coded signal to the required form of signal may be integrated in a general purpose integrated circuit, an inexpensive control apparatus for the automobile air conditioner is provided.

I claim:

1. In an air conditioner of an automobile having a heater core and an evaporator core, a control apparatus comprising:
   duct means in which said cores are arranged;
   a plurality of doors arranged in said duct means, including a door for switching flow path of air flowing in said cores, a door for selecting inlet port of air and a door for selecting exit of cool/warm air flowing from said cores;
   control elements constituting, along with said doors, said air conditioner;
   a plurality of vacuum actuators for actuating said doors and said control elements;
   electrically actuatable vacuum switching valves disposed between said vacuum actuators and a vacuum source for controlling the introduction and blocking of vacuum to and from said actuator;
   actuation means for electrically actuating said vacuum switching valves;
   a transistor circuit for controlling energization and deenergization of said actuation means;
   a logical operation circuit for providing a control signal to said transistor circuit, said logical operation circuit decoding a received binary coded signal to control said transistor circuit;

means for producing binary coded signals each of which is unique to respective one of a plurality of switching modes for said doors and said control elements; and electrical wires for conducting said binary coded signal produced by said means to said logical operation circuit.

2. A control apparatus according to claim 1, wherein said means for producing binary coded signals includes a dash control box, a lever mounted in said dash control box, a movable contact unit adapted to be in interlocking movement with said lever, a plurality of sliders mounted on said movable contact unit, said sliders being interconnected through conductors, a plurality of rows of stators arranged on path of movement of said sliders, and circuit means formed by the contact of said movable contact and said stationary contacts for making a potential at the junction of said electrical wires and a power supply at the ground potential.

3. A control apparatus according to claim 2, wherein the number of said electrical wires is less than the number of said rows of stators.

4. In an air conditioner of an automobile having a heater core and an evaporator core, a control apparatus comprising:
   duct means in which said cores are arranged;
   a plurality of doors arranged in said duct means, including a door for switching flow path of air flowing in said cores, a door for selecting inlet port of air and a door for selecting exit of cool/warm air flowing from said cores;
   control elements constituting, along with said doors, said air conditioner;
   a plurality of vacuum actuators for actuating said doors and said control elements;
   electrically actuatable vacuum switching valves disposed between said vacuum actuators and a vacuum source for controlling the introduction and blocking of vacuum to and from said actuator;
   actuation means for electrically actuating said vacuum switching valves;
   a transistor circuit for controlling energization and deenergization of said actuation means;
   a control means for providing a control signal to said transistor circuit, said control means decoding a received binary coded signal to control said transistor circuit;
   means for producing binary coded signals each of which is unique to respective one of a plurality of switching modes for said doors and said control elements; and
   electrical conductors for conducting said binary coded signals produced by said means to said control circuit.

5. In an air conditioner of an automobile having a heater core and an evaporator core, a control apparatus comprising:
   duct means in which said cores are arranged;
   a plurality of doors arranged in said duct means, including a door for selecting an inlet port for air, a door for selecting an exit for cool/warm air flowing from said cores and a door for selecting air supply to a windshield of the automobile;
   control elements constituting, along with said doors, said air conditioner;
   a plurality of operating means for operating at least one of said doors and at least one of said control elements, said operating means including a plurality of electromagnetic coils;
   a plurality of switching means for controlling energization and deenergization of said electromagnetic coils;
   means for producing specified binary coded signals corresponding to a plurality of modes for switching said doors and control elements; and
   a control circuit for controlling said switching means in accordance with said binary coded signals, said control circuit including decoder means for decoding said binary coded signals.

6. A control apparatus according to claim 5, wherein said operating means further include vacuum actuators and valve means for controlling supply of vacuum to the vacuum actuators, said electromagnetic coil operating the valve means.

7. A control apparatus according to claim 5, wherein said electromagnetic coils generate an electromagnetic attractive or repulsive force, said operating means include actuator members connected to said doors and control elements, for operating said doors and control elements when they undergo attraction or repulsion by the attractive or repulsive force of said electromagnetic coils.

8. A control apparatus according to claim 5, wherein said control circuit comprises a computer which includes:
   an input unit for fetching said binary coded signals;
   an output unit for delivering an output to said switching means;
   said decoder means for decoding said binary coded signal; and
   a signal transmission bus connecting said input and output units to said decoder means.

9. A control apparatus according to claim 8, wherein said decoder means for said binary coded signal includes an arithmetic and logic unit of a microcomputer which decodes said binary coded signal through logic operation.

10. A control apparatus according to claim 8, wherein said decoder means for said binary coded signal includes at least one memory of a computer, said memory containing information of said binary coded signals corresponding to each of the modes and output signal information corresponding to each of said binary coded signals, both of said informations being stored in said memory in advance, so that the binary coded signals sent from said means for producing binary coded signals are compared with the binary coded signal information stored in said memory to deliver an output signal corresponding to a coincident binary coded signal as a result of the comparison to said output unit.

11. A control apparatus according to claim 5, in which said conditioner comprises a blower motor for supplying air to said evaporator core and said heater, said control apparatus further comprising:
   a speed control circuit for said blower motor;
   means for producing specified binary coded signals corresponding to pre-set speed modes of said blower motor; and
   another control circuit controlling the output of said speed control circuit in accordance with said binary coded signals, said another control circuit including decoder means disposed in said control circuit controlling the output of said speed control circuit, by decoding said binary coded signals.

12. A control apparatus according to claim 11, wherein said control circuit for controlling said switching means and said another control circuit for controlling the output of said speed control circuit are constituted by a single computer, in which:
- said input unit is capable of fetching binary coded signals corresponding to the switching modes, along with other specified binary coded signals corresponding to said preset speed modes;
- said output unit is capable of producing outputs to said switching means and said speed control circuit;

said decoder means includes a single decoder for decoding each of two of said binary coded signals; and a signal transmission bus is provided for connecting said input and output units to said decoder.

13. A control apparatus according to claim 11, wherein said another control circuit for controlling the output of said speed control circuit in accordance with said binary coded signals comprises:
- output means for producing a digital signal in accordance with said binary coded signals; and
- a D/A converter circuit for converting the digital signal into an analog signal.

* * * * *